(12) United States Patent
Rajagopalan et al.

(10) Patent No.: US 10,392,266 B2
(45) Date of Patent: *Aug. 27, 2019

(54) TREATMENT OF PRODUCED WATER USING INDIRECT HEAT

(71) Applicant: CONOCOPHILLIPS COMPANY, Houston, TX (US)

(72) Inventors: Suriyanarayanan Rajagopalan, Sugar Land, TX (US); Dale Embry, Houston, TX (US); Edward Latimer, Ponca City, OK (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/244,150

(22) Filed: Aug. 23, 2016

(65) Prior Publication Data

US 2017/0057836 A1    Mar. 2, 2017

Related U.S. Application Data

(60) Provisional application No. 62/210,214, filed on Aug. 26, 2015.

(51) Int. Cl.
| | |
|---|---|
| C02F 1/16 | (2006.01) |
| B01D 1/02 | (2006.01) |
| B01D 5/00 | (2006.01) |
| B01D 1/00 | (2006.01) |
| B01D 1/30 | (2006.01) |
| C02F 103/10 | (2006.01) |
| E21B 43/24 | (2006.01) |

(52) U.S. Cl.
CPC .............. *C02F 1/16* (2013.01); *B01D 1/0058* (2013.01); *B01D 1/02* (2013.01); *B01D 1/305* (2013.01); *B01D 5/006* (2013.01); *C02F 2103/10* (2013.01); *E21B 43/2406* (2013.01)

(58) Field of Classification Search
CPC ........... C02F 1/16; B01D 1/0058; B01D 1/02; B01D 1/305; B01D 5/006
See application file for complete search history.

(56) References Cited

U.S. PATENT DOCUMENTS

| | | | | |
|---|---|---|---|---|
| 4,131,507 A | * | 12/1978 | Morales | B01D 1/00 122/158 |
| 6,536,523 B1 | * | 3/2003 | Kresnyak | B01D 1/0047 166/266 |
| 7,037,430 B2 | * | 5/2006 | Donaldson | B01D 61/022 210/652 |
| 7,077,201 B2 | * | 7/2006 | Heins | C02F 1/04 166/266 |
| 8,052,763 B2 | * | 11/2011 | Gallot | B01D 1/0047 23/295 R |
| 8,097,128 B1 | * | 1/2012 | Sherry | B05B 1/308 203/11 |
| 8,656,999 B2 | | 2/2014 | Latimer | |

(Continued)

*Primary Examiner* — Jonathan Miller
(74) *Attorney, Agent, or Firm* — Boulware & Valoir

(57) ABSTRACT

Systems and methods utilize heated waste flue gas to indirectly heat untreated water. The heated waste flue gas, which may come from a steam generator, passes through one or more heating coils in a vessel to vaporize untreated water and separate out solids and other contaminants before subsequent condensing. The steam generator may receive resulting treated water to produce steam for injection.

14 Claims, 3 Drawing Sheets

(56) References Cited

U.S. PATENT DOCUMENTS

| | | | |
|---|---|---|---|
| 8,951,392 B2* | 2/2015 | James | B01D 1/065 159/13.2 |
| 9,114,406 B2* | 8/2015 | Betzer Tsilevich | B03D 1/02 |
| 9,770,671 B2* | 9/2017 | Curlett | B01D 1/14 |
| 2010/0264068 A1 | 10/2010 | Ikebe | |
| 2011/0147195 A1* | 6/2011 | Shapiro | C02F 1/16 203/10 |
| 2013/0248454 A1 | 9/2013 | Frisk | |
| 2014/0110109 A1* | 4/2014 | Latimer | F22B 1/18 166/267 |
| 2014/0151296 A1 | 6/2014 | Moore | |
| 2015/0096754 A1* | 4/2015 | Larkin | E21B 43/2406 166/303 |
| 2016/0114260 A1* | 4/2016 | Frick | B01D 3/007 203/12 |
| 2016/0258266 A1* | 9/2016 | Frick | B01D 3/007 |
| 2016/0368785 A1* | 12/2016 | Zamir | C02F 1/16 |

* cited by examiner

TREATMENT OF PRODUCED WATER USING INDIRECT HEAT

PRIOR RELATED APPLICATIONS

This application is a non-provisional application which claims benefit under 35 USC § 119(e) to U.S. Provisional Application Ser. No. 62/210,214 filed Aug. 26, 2015, entitled "TREATMENT OF PRODUCED WATER USING INDIRECT HEAT," which is incorporated herein in its entirety.

FIELD OF THE DISCLOSURE

The invention relates to treatment methods for water, particularly produced water from oil fields, using indirect heat.

BACKGROUND OF THE DISCLOSURE

The effective production of hydrocarbon reservoirs containing heavy oils or unconventional oils presents significant challenges. Extraction of these high viscosity hydrocarbons is difficult due to their relative immobility at reservoir temperature and pressure. These properties make it difficult to simply pump the unconventional oil out of the ground. Such hydrocarbons may be quite thick and have a consistency similar to that of peanut butter or cold molasses, making their extraction from reservoirs difficult.

Enhanced oil recovery processes employ thermal methods to improve the recovery of heavy oils from sub-surface reservoirs. The injection of steam into heavy oil bearing formations is a widely practiced enhanced oil recovery method. Typically, several metric tons of steam are required for each metric ton of oil recovered.

Traditionally, heavy oil recovery operations have utilized "once through" type steam generators. The steam or a steam-water mixture is injected via injection wells to fluidize the heavy oil. Different percentages of water and steam can be injected into the injection wells, depending on a variety of factors including the expected output of oil and the economics of injecting different water/steam mixtures. Steam heats the oil in the reservoir, which reduces the viscosity of the oil and allows the oil to flow to a collection well. After the steam fully condenses and mixes with the oil, the condensed steam is classified as produced water. The mixture of oil and produced water that flows to the production well is pumped to the surface. Oil is separated from the water by conventional processes employed in conventional oil recovery operations.

For economic and environmental reasons, it is desirable to recycle produced water. The produced water stream, after separation from the oil, is further de-oiled, and is treated for reuse. Most commonly, the water is sent to the "once-through" steam generators for creation of more steam for oil recovery operations.

Many patents and patent applications are directed to methods for treating produced water, including US20130248454, US20100264068, US20140151296. However, currently known and utilized methods for treating heavy oil field produced waters in order to generate high quality steam for down-hole are not entirely satisfactory because:

most physical chemical treatment systems are quite extensive, are relatively difficult to maintain, and require significant operator attention;

treatment systems require large amounts of expensive chemicals, many of which require special attention for safe handling, and which present safety hazards if mishandled; and, a large quantity of unusable hot water is created, and the energy from such water must be recovered, as well as the water itself, in order to maintain an economic heat and material balance in operations.

Many attempts have been made to overcome these issues. For instance, U.S. Pat. No. 8,656,999, by the Applicants, describes a treatment method that injects untreated produced water into a direct steam generator to generate a steam and an effluent stream with impurities that are combusted by the direct steam generator. While a step in the right direction, there is always a need for improved methods of treating produced water.

Thus, there exist a need for a quick and cost effect means of treating produced water for reuse or disposal. Ideally, the treatment will not require expensive equipment or treatment systems, require large amounts of chemicals, increase energy consumption or waste energy.

SUMMARY OF THE DISCLOSURE

The present disclosure describes a system and method for utilizing waste heat energy to vaporize untreated water for use in enhanced oil recovery techniques. The vaporization occurs in a semi-batch stage allowing for scheduled maintenance and repair between one or more batches.

Flue gas exiting a furnace, such as a Once Through Steam Generator (OTSG), typically has a temperature range between 170° C. and 240° C. The present system utilizes this heated flue gas to treat untreated water, particularly produced water, to remove solids and sediments. The OTSG exiting flue gas has enough heat to vaporize water, thus separating out most solids.

Specifically, heated flue gas exiting an OTSG will be introduced into heating coils inside of a batch vessel containing untreated water, thus vaporizing the water to steam using indirect heat in a semi-batch mode.

The batch vessel will be filled to a predetermined level with untreated water. As the level of untreated water in the vessel decreases, it needs to be continuously replenished. In one embodiment, the untreated water is continuously added such that the level is within +/−5% volume of the predetermined level. In other embodiments, the untreated water level is allowed to decrease to lower preselected level such as twenty five percent of the batch vessel volume before more untreated water is added.

The heating coils reside inside the batch vessel, in contact with the untreated water. Various coil geometries are possible, such as a cylindrical shape in the middle of the batch vessel or a rising spiral configuration along the inner walls of the batch vessel.

The top of the batch vessel containing the untreated water has a demister pad to collect any solids that may rise with the steam. Solids and any sediments remaining at the bottom of the batch vessel can be removed between batches of untreated water. Because the flue gas may need to be shutdown during removal, some embodiments of the present system utilize two or more batch vessels allowing for at least one batch vessel to remain active while the other undergoes removal of solids and sediments. Ideally, all batch vessels in a given system have the same coil orientation.

During the normal course of the vaporization, it may be difficult for sediments to settle at the bottom of the batch vessel. However, after repeated batches of water processing with no downtime, enough sediment slurry should form at the bottom such that it can be drained. The amount of sediment in the bottom of the batch vessel can be monitored and, once enough sediment has settled, the flue gas can be stopped to allow for draining of the sediment slurry.

The steam leaving the vessel is cooled using a condenser and then sent to a knockout pot where water, free of contaminants and solids, is removed from the bottom of the knockout pot. The treated water can then undergo additional treatments to be compliant for reuse. The condenser is a heat exchanger used to remove heat from the steam. The knockout drum is a device to capture liquids that may be entrained in the vapor leaving the condenser. These can be separate pieces of equipment, but the functions are frequently done simultaneously within a specially designed piece of equipment.

The cooled flue gas exiting the heating coils can, if necessary, undergo further treatment to be compliant with atmospheric release regulations. Alternatively, the steam can be fed back into the OTSG system, for re-use in the reservoir.

Any untreated water stream with contaminants and/or solids can be treated in the present system, including feedwater, brackish water, produced water and mixtures or combinations thereof. After treatment by the present system, the treated water can undergo additional processing and treatment if desired.

The benefit of the described system is the ability to clean produced water using heat energy that would otherwise be wasted. While additional treatment methods can follow the present system, the present system and method itself does not require large amounts of chemicals. Further, expensive specialty equipment is not needed for the present system.

In one embodiment of the present disclosure, a batch vessel with one or more heating coils residing in the vessel and a demister located at the top of the vessel is filled with untreated water. Heated waste flue gas generated by a furnace is introduced into the heating coils, which transfer heat to the untreated water to vaporize the water into steam. Any remaining solids are collected by the demister or settle at the bottom of the batch vessel for later removal. The steam is removed from the batch vessel, condensed and collected as a treated water. This water can undergo additional treatment before being recycled or disposed of.

A variation of the above embodiment is a system containing two or more batch vessels wherein the operation of the batch vessels are staggered to allow for removal of solids and sedimentation from at least one batch vessel while the remaining vessels continue to treat water.

In another embodiment, heated flue gas, generated by a furnace, indirectly heats untreated water using heating coils in a batch vessel to vaporize some or all of the untreated water. The demister is there to collect solids and particulate contaminants that are carried over with the treated water steam from the vigorous boiling that occurs within the batch vessel. The waste gas stream generated may be sent for further treatment. The steam is removed from the batch vessel, condensed and separated into a treated water stream and a waste gas stream.

Another embodiment is a method for removing contamination and solids from an untreated water comprising flowing heated waste flue gas through one or more heating coils in contact with untreated water in a batch vessel to vaporize the water and remove the solids and other contaminants. The steam and flue gas are removed from the batch vessel, leaving solids, sediments, and other heavy residue in the batch vessel. The vaporized water is condensed in a condenser and separated from additional solids in a knock-out pot. The treated water stream can undergo additional treatment for use in other processes. The cooled waste gas stream can also be treated to meet federally regulated conditions.

In some embodiments, the treated water is reused in a steam generator to produce steam for enhanced oil recovery.

Yet another embodiment is a method for generating steam for enhanced oil recovery techniques using a furnace. Contaminants and solids are removed from an untreated water by flowing heated waste flue gas from the furnace through one or more heating coils in contact with the untreated water in a batch vessel to vaporize the water and remove the solids and other contaminants. The vaporized water and flue gas are removed from the batch vessel, leaving solids, sediments, and residue in the batch vessel. The vaporized water is condensed in a condenser and separated from additional solids in a knock-out pot. The treated water stream is then introduced into the furnace for steam generation. The waste flue gas can undergo additional separation methods to remove residual water.

This summary is provided to introduce a selection of concepts that are further described below in the detailed description. This summary is not intended to identify key or essential features of the claimed subject matter, nor is it intended to be used as an aid in limiting the scope of the claimed subject matter.

The term "untreated water" encompasses all water used for enhanced recovery techniques such as SAGD that has not undergone significant pretreatment to e.g., remove dissolved solids before being heated and includes sources such as feedwater, brackish water and water recovered from a production fluid.

The term "produced water" is used herein to describe water that is produced as a byproduct along with oil and gas and has been separated from the majority of hydrocarbons. This water is often pretreated and mixed with other streams of water before re-use or disposal.

The terms "treated produced water" and "produced water free of contaminants and solids" are used interchangeable herein and refer produced water that has undergone treatment using the embodiments described in this disclosure.

The term "batch vessel" refers to a vessel or container having heating coils therein and where a batch of produced water is treated using waste heated flue gas from an OTSG in the coils. The term batch vessel includes those batch vessels that are equipped for semi-batch operation.

The term "knock-out pot" refers to a device designed to capture liquids that may be entrained in the vapor leaving a condenser. It is sometimes combined with a condenser in specialty equipment.

The term "semi-batch" refers to tanks or reactors that operate much like batch reactors in that they take place in a single stirred tank with similar equipment. However, they are modified to allow reactant addition and/or product removal in time.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| OTSG | Once-through steam generator |
| SAGD | Steam-Assisted Gravity Drainage |

DESCRIPTION OF EMBODIMENTS OF THE DISCLOSURE

A novel system and method for treating water on an oil pad is disclosed. Heated waste flue gas from e.g., a once-through steam generator is used to vaporize untreated water in a batch vessel. Most un-vaporized solids and sediments remain in the contact vessel.

Figure 1:
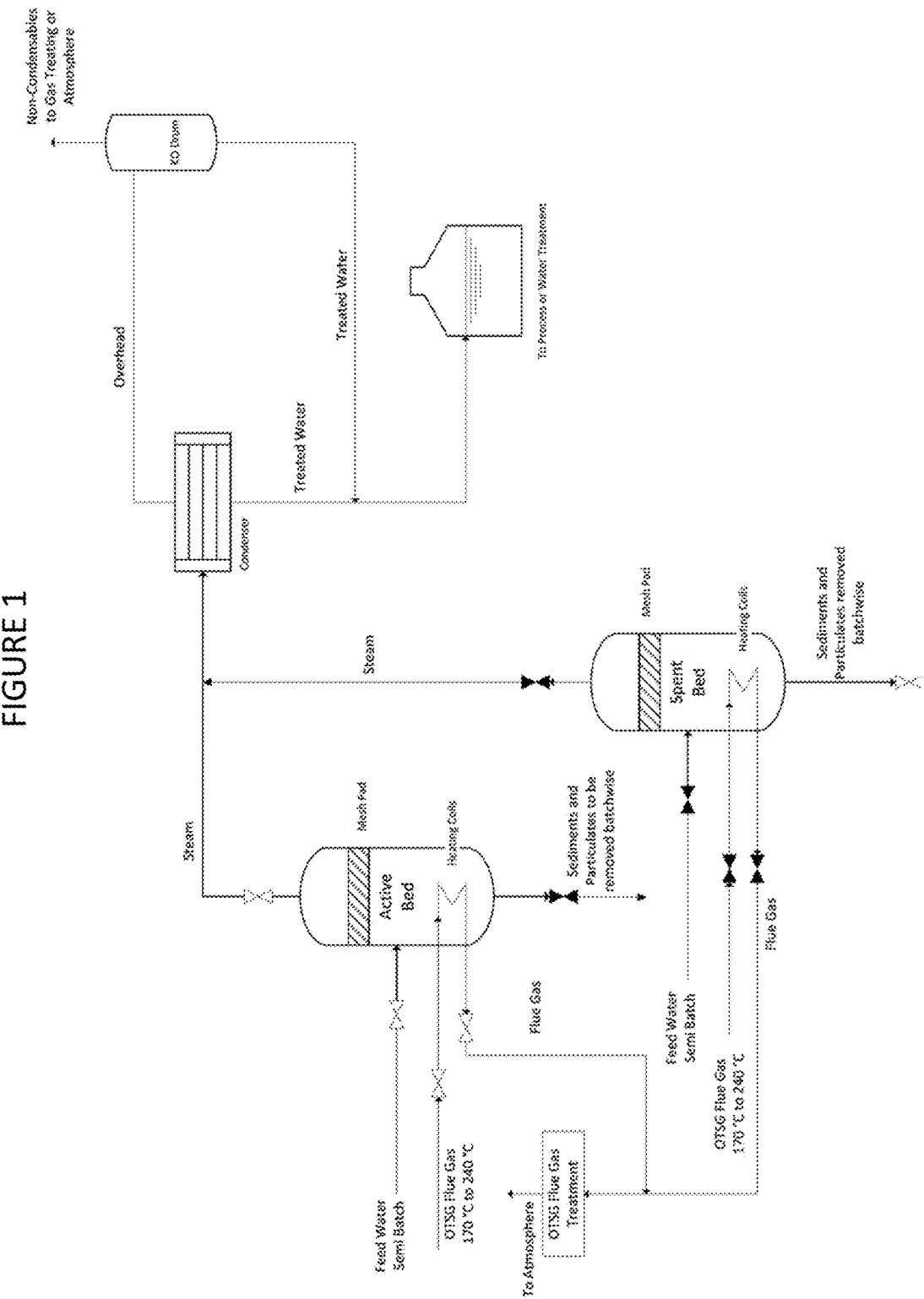
FIG. 1. displays a block flow diagram of one embodiment of the described system for vaporizing untreated water using indirect heating provided by waste flue gas.

One embodiment of the presently disclosed system is shown in FIG. 1. In this system, heated flue gas from an OTSG is introduced into one or more heating coils resided in a batch vessel having a batch of untreated water. The flue gas has a temperature range of at least 170° C. to 240° C., which is high enough to vaporize water to form steam through indirect heating. The bent line at the bottom of each of the batch vessels represent the heating coils used to transfer heat from the hot flue gas to the water which generates the steam.

Figure 2:
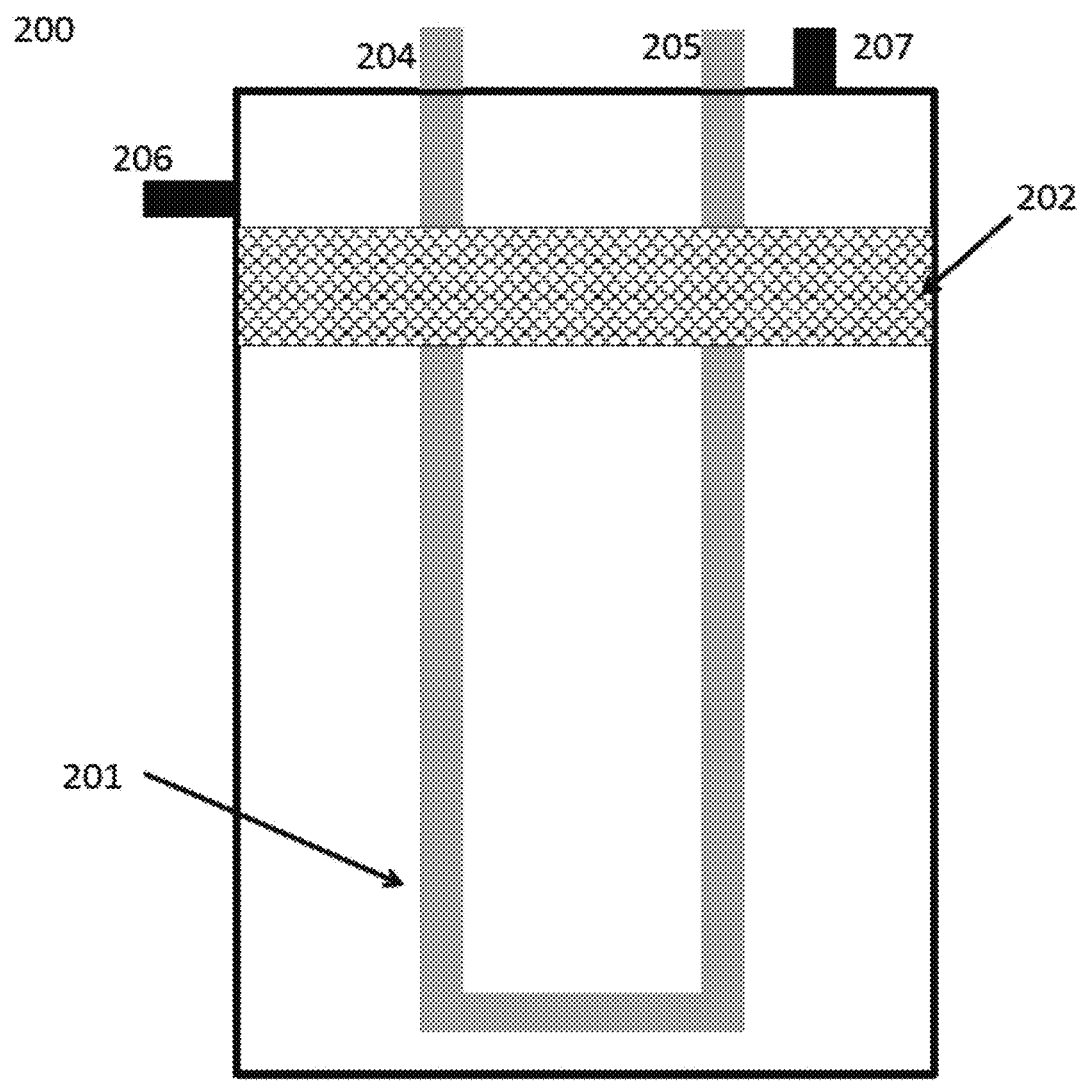
FIG. 2. displays a batch vessel according to one embodiment of the system using one centrally located heating coil.
Figure 3:
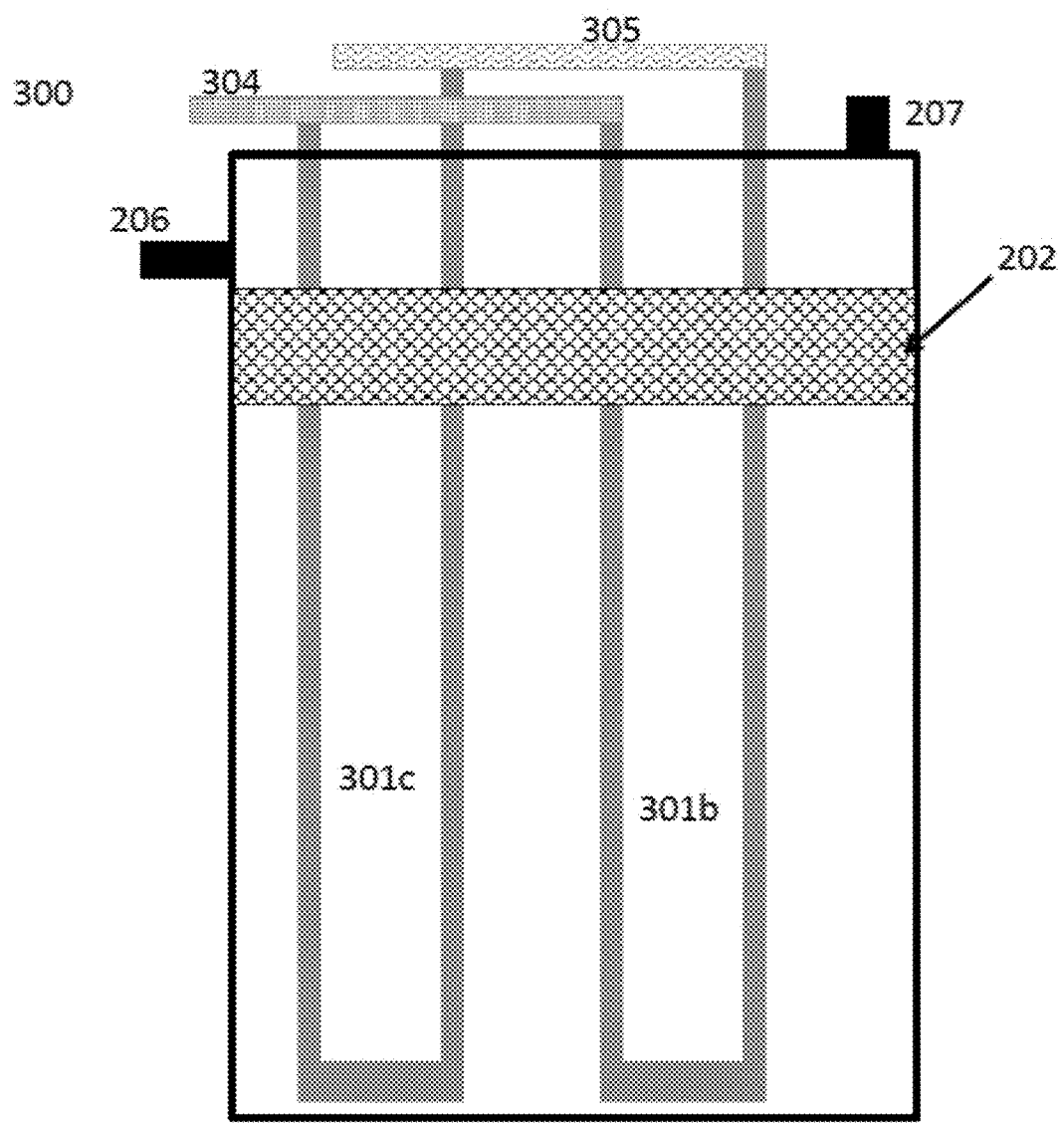
FIG. 3. displays a batch vessel according to one embodiment of the system using multiple heating coils.

Batch vessels according to one or more embodiments are shown in more detail in FIGS. 2 and 3. Referring to FIG. 2, the batch vessel (200) has an inlet (204) for heated waste flue gas to enter a centrally located heating coil (201). Heated flue gas circulates through the heating coil (201) and the heating coil transfers heat from the gas to the untreated water in the batch vessel (200), resulting in the vaporization of the untreated water to steam. The untreated water is added to the batch vessel via an inlet (206) such that the level of the water is at predetermined level (not shown).

As the steam rises to the top of the batch vessel, it moves through a demister (202) located above the water line, which traps any solids still in the vaporized water. Most contaminants and solids do not rise with the gases and remain in the lower section of the contact vessel below the demister. Eventually, the contaminants and solids in this lower section settle to the bottom of the batch vessel forming sediment. In some cases, multiple batches of water processing are necessary before the sediment slurry will have to be removed from the batch vessel or demister.

The cooled flue gas exits the batch vessel through a first outlet (205), separate from the steam that is exiting through a second outlet (207).

FIG. 3 displays a batch vessel (300) with multiple heating coils (301c, 301b) being fed by separate heated flue gas inlets (304). The cooled flue gas exits the multiple heating coils (301c, 301b) through an outlet (305). In many embodiments, the exiting cooled flue gas undergoes treatment such that it complies with federal regulations for atmospheric release.

In FIG. 1, two batch vessels are shown with one being "active" and the other "spent". By using more than one batch vessel, the system is able to continuously treat water while one batch vessel has the sediments and particulates removed. Thus, the "active" bed has heated flue gas flowing through the heating coils to indirectly heat the untreated water while no flue gas is entering the "spent" bed as it waits from sediments and particulates to be drained and removed.

The flue gas and steam exit the top of the batch vessel. The steam is introduced into a condenser, which condenses the steam to produce a treated, contaminant free stream. The treated water can be collected and recycled for use in steam generation or other applications or disposed of. In some methods, the treated water and/or flue gas must undergo additional treatment to be in compliance with acceptable standards.

Any untreated water can be treated by the present system and method, including feedwater, brackish water and/or produced water. In some embodiments, only produced water is treated after it has been separated from the recovered hydrocarbon stream and de-oiled. In other embodiments, the produced water is combined with e.g. feedwater or makeup water before treatment.

The benefit of the described system is the ability to clean produce water using heat energy that would otherwise be wasted. This will improve the cost balance of an enhanced oil recovery operation.

The disclosed system and methods comprises one or more of the following embodiments, in any combination thereof:

A water treatment system, comprising: a heated flue gas stream generated by a furnace; an untreated water stream; at least one batch vessel (or semi-batch vessel) for generating a steam, said batch vessel having at least one coiled tube contained within and a demister tray at the top of said batch vessel, and wherein said batch vessel has an inlet for said untreated water stream, an outlet for steam, and an inlet and outlet for said heated flue gas stream to enter and exit said coiled tube; a condenser in fluid communication with said at least one batch vessel and having a steam inlet, wherein said condenser has a first treated water outlet and a overhead gas outlet; a knock out drum in fluid communication with said condenser and having an inlet for overhead gas and a second treated water outlet, and wherein said treated water from said condenser and knock drum are combined.

A system for generating steam for enhanced oil recovery, comprising: a furnace for generating a heated flue gas stream and a first steam stream; an untreated water stream; at least one batch vessel for generating a second steam stream, said batch vessel having a top and bottom and at least one heating coil extending therein to receive said heated flue gas stream, wherein the top has a steam outlet and a demister tray, and said batch vessel having an inlet for said untreated water steam; a condenser in fluid communication with said at least one batch vessel and having an inlet to receive said second steam stream, wherein said condenser has a first treated water outlet and a overhead gas outlet; and a knock out drum in fluid communication with said condenser and having an inlet for overhead gas and a second treated water outlet, wherein said treated water from said condenser and knock drum are combined and introduced into said furnace.

An improved steam generating system for enhanced oil recovery, said steam generating system comprising a furnace for generating a heated flue gas stream and a first steam stream, said improvement comprising: an untreated water stream; at least one batch vessel for generating a second steam stream, said batch vessel having a top and bottom, an inlet for said untreated water stream, and one or more heating coils therein in contact with said untreated water stream, wherein said heating coils receive said heated flue gas, said batch vessel further comprising a demister tray and an outlet for said second steam stream at the top; a condenser in fluid communication with said at least one batch vessel and having a second steam stream inlet, wherein said condenser has a first treated water outlet and a overhead gas outlet; a knock out drum in fluid communication with said condenser and having an inlet for overhead gas and an outlet for flue gas and a second treated water outlet; and wherein said treated water from said condenser and knock drum are combined and introduced into said furnace to be converted into steam.

A method of treating water using waste flue gas comprising: admitting a batch of untreated water into a batch vessel, wherein said batch vessel has at least one heating coil therein and in contact with said untreated water and a demister; passing a heated waste flue gas stream through said at least one heating coil; heating said at least one heating coil with heated waste flue gas stream; vaporizing said batch of untreated water with at least one heated heating coil to create steam; flowing said steam through said demister to remove solids; condensing said steam in a condenser to form an overhead gas stream and a condensed water stream; separating said overhead gas stream and said condensed water stream; passing said overhead gas stream through a knock out drum to remove residual water; combining said residual water and said condensed water stream to form a treated water.

A method of treating produced water using waste flue gas comprising: admitting a batch of untreated water into a batch vessel, wherein said batch vessel has at least one heating coil in contact with said untreated water and a demister; passing a heated waste flue gas stream through heating coil; heating said at least one heating coil with said heated waste flue gas; vaporizing said batch of untreated produced water with said heated heating coil to create steam; flowing said steam through said demister to remove solids; condensing said steam in a condenser to form an overhead gas stream and a condensed water stream; separating said overhead gas stream and said condensed water stream; passing said overhead gas stream through a knock out drum to remove residual water; combining said residual water and said condensed water stream to form a treated produced water.

A method of generating steam for enhanced oil recovery techniques comprising: admitting a batch of untreated water into a batch vessel, wherein said batch vessel has at least one heating coil in contact with said untreated water and a demister; passing a heated waste flue gas stream through said at least one heating coil; heating said at least one heating coil with said heated waste flue gas; vaporizing said batch of untreated water with said heated heating coil to create steam; flowing said steam through said demister to remove solids; condensing said steam in a condenser to form an overhead gas stream and a condensed water stream; separating said overhead gas stream and said condensed water stream; passing said overhead gas stream through a knock out drum to remove residual water; combining said residual water and said condensed water stream to form a treated water; heating said treated water in a furnace to generate a steam for enhanced oil recovery and a waste flue gas, wherein said waste flue gas is used in said passing step.

A system or method as herein described wherein said heated flue gas stream exits said at least one cooling tube as a cooled flue gas stream.

A system or method as herein described said cooled flue gas stream undergoes additional treatment.

A system or method as herein described wherein said heated flue gas stream has a temperature between 170° C. and 240° C.

A system or method as herein described wherein said untreated water stream is produced water, feedwater, brackish water or mixtures thereof A system or method as herein described wherein said heated flue gas is generated by a once-through steam generator.

A system or method as herein described further comprising removing solids from said demister in said batch vessel and sediments from the bottom of said batch vessel.

A system or method as herein described further comprising introducing said treated water into a steam generator for enhanced oil recovery techniques, such as SAGD A system or method as herein described further comprising removing said heated flue gas from said heating coils.

A system or method as herein described wherein a second batch vessel having a second demister therein and having a second heating coil therein fluidly connected to a heated waste flue gas, wherein said second batch vessel is fluidly connected to said condenser, and said second batch vessel is in use while said batch vessel is being cleaned.

The present invention is exemplified with respect to produced water. However, this is exemplary only, and the system can be broadly applied to other untreated water having solids. The following examples are intended to be illustrative only, and not unduly limit the scope of the appended claims.

The invention claimed is:

1. A method of generating steam for enhanced oil recovery techniques, comprising:
   admitting a batch of untreated water into a batch vessel, wherein the batch vessel has a demister and at least one heating coil in contact with the untreated water;
   passing a heated waste flue gas stream through the at least one heating coil, wherein the heated waste flue gas has a temperature between 170° C. and 240° C.;
   heating the at least one heating coil with the heated waste flue gas;
   vaporizing the batch of untreated water with the heated heating coil to create intermediate steam;

flowing the intermediate steam through the demister to remove solids;

condensing the intermediate steam in a condenser to form an overhead gas stream and a condensed water stream;

separating the overhead gas stream and the condensed water stream;

passing the overhead gas stream through a knock out drum to remove residual water;

combining the residual water and the condensed water stream to form a treated water; and heating the treated water in a furnace to generate an injection steam for the enhanced oil recovery and to generate the heated waste flue gas stream passed through the at least one heating coil.

2. The method of claim 1, wherein the furnace is a once-through steam generator.

3. The method of claim 1, wherein the enhanced oil recovery technique comprises steam assisted gravity drainage.

4. The method of claim 1, wherein a second batch vessel having a second demister therein and having a second heating coil therein fluidly connected to the heated waste flue gas stream, wherein the second batch vessel is fluidly connected to the condenser, and the second batch vessel is in use while the batch vessel is being cleaned.

5. The method of claim 1, wherein the untreated water is produced water.

6. A method of treating water using waste flue gas, comprising:

admitting a batch of untreated water into a batch vessel, wherein the batch vessel has at least one heating coil therein and in contact with the untreated water;

passing a heated waste flue gas stream from a steam generator through the at least one heating coil, wherein the heated flue gas has a temperature between 170° C. and 240° C.;

vaporizing the batch of untreated water with the at least one heating coil to create steam;

removing solids from the steam;

condensing the steam to form treated water.

7. The method of claim 6, further comprising removing solids from a demister in the batch vessel and sediments from a bottom of the batch vessel.

8. The method of claim 6, further comprising introducing the treated water into the steam generator for enhanced oil recovery techniques.

9. The method of claim 8, wherein the enhanced oil recovery technique comprises steam assisted gravity drainage.

10. The method of claim 6, further comprising removing the heated flue gas from the heating coils.

11. The method of claim 6, wherein the untreated water is at least one of feedwater, brackish water and produced water.

12. The method of claim 6, wherein the untreated water is produced water.

13. The method of claim 6, wherein all the steam from the batch vessel is condensed to form the treated water.

14. The method of claim 6, wherein the heated flue gas is generated by a once-through steam generator.

* * * * *